Nov. 9, 1954 W. C. SCHAFFER 2,693,675
JET ENGINE FUEL CONTROL SYSTEM
Filed Sept. 1, 1949 2 Sheets-Sheet 1
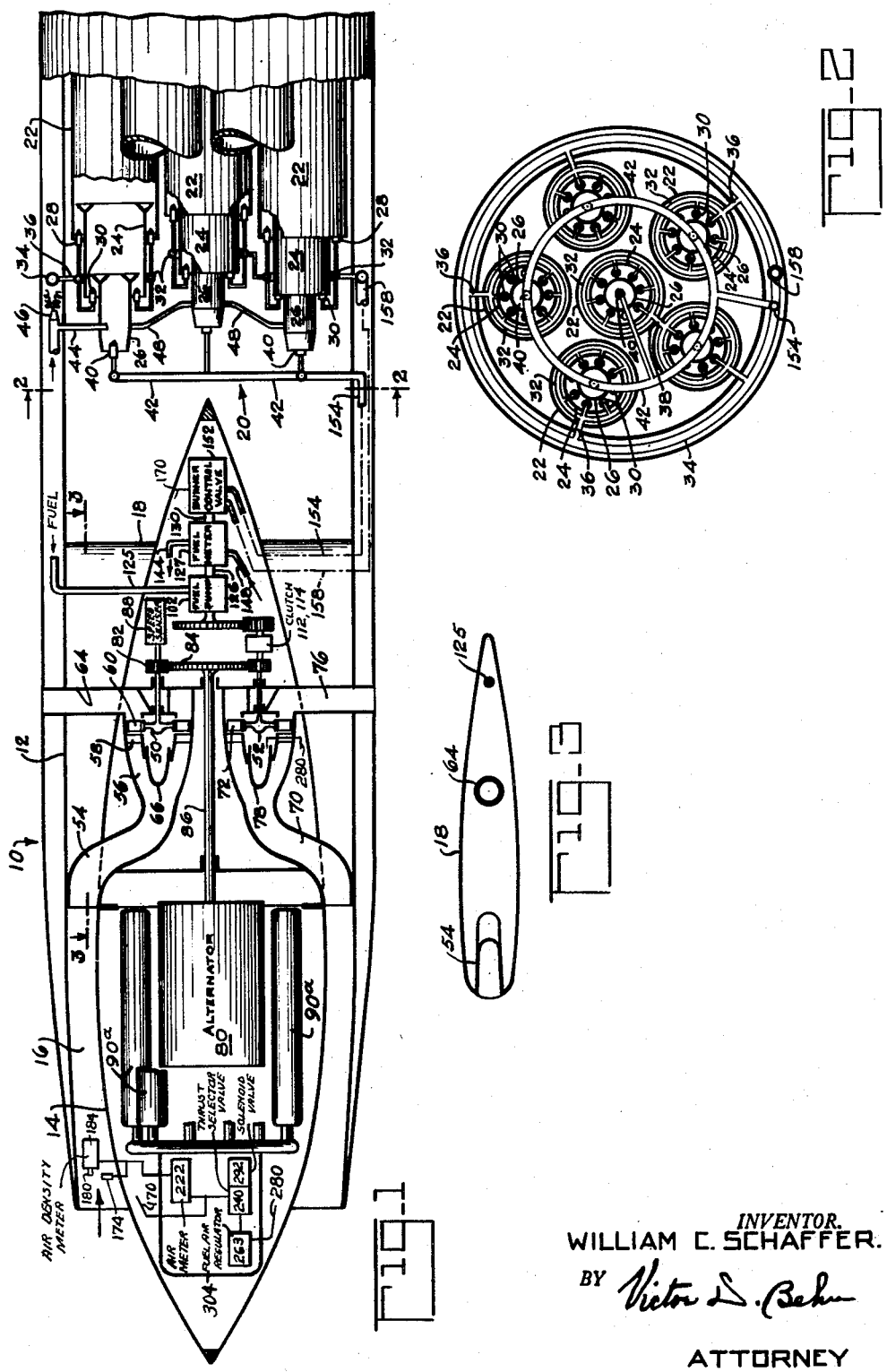
INVENTOR.
WILLIAM C. SCHAFFER.
BY *Victor D. Behn*
ATTORNEY

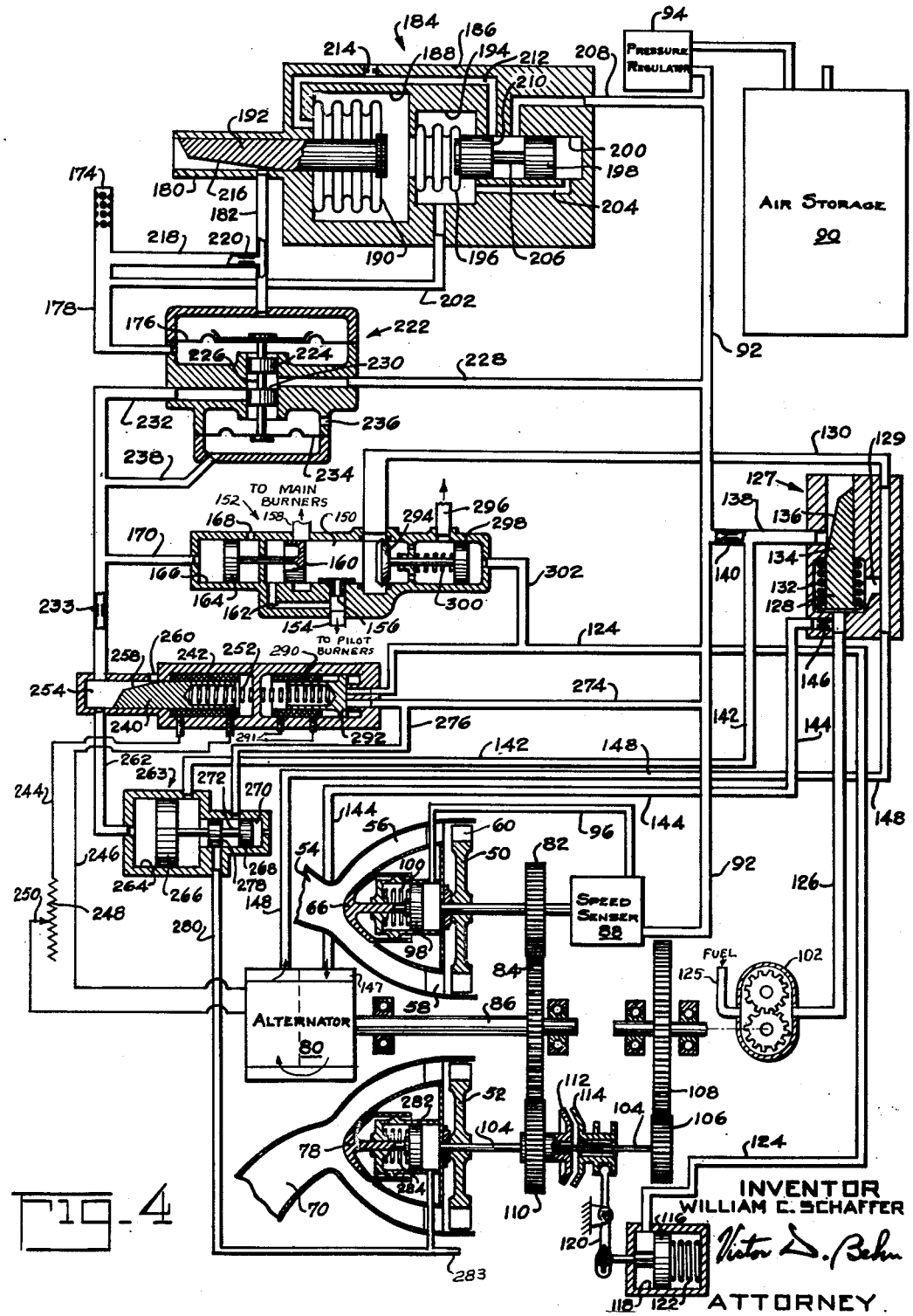

United States Patent Office 2,693,675
Patented Nov. 9, 1954

2,693,675

JET ENGINE FUEL CONTROL SYSTEM

William C. Schaffer, Fair Lawn, N. J., assignor to Curtiss-Wright Corporation, a corporation of Delaware Application September 1, 1949, Serial No. 113,517

12 Claims. (Cl. 60—39.28)

This invention relates to jet power plants for guided missiles and/or for pilot controlled aircraft and is particularly directed to power control means for such a power plant.

The primary function of a ram jet power control system is the regulation of the thrust produced by the ram jet power plant. It is an object of this invention to provide a novel ram jet power control system in which the thrust is regulated by operation of a single control member. Further objects of the invention comprise the provision of a power control system for a ram jet power plant in which (1) means are provided to pre-flight check the power plant accessories, (2) means are provided to cool various accessories of the power plant such as an electric generator, (3) means are provided to control the speed of the electric generator, and/or (4) means are provided for controlling the fuel supplied to the pilot burners.

The power control system of the invention includes means for varying the fuel flow to the burners with changes in the mass flow of air to said burners. In order to provide a fluid pressure proportional to the mass flow of air it is necessary to vary said fluid pressure with changes in the density of said air. A further object of the invention comprises the provision of a novel form of air density meter.

Other objects of the invention will become apparent upon reading the annexed detailed description in connection with the drawing in which:

Figure 1 is a schematic view of a ram jet power plant embodying the invention;

Figures 2 and 3 are views taken along lines 2—2 and 3—3, respectively, of Figure 1; and Figure 4 is a diagrammatic view of the power control system.

The power control system of the present invention has been designed for use in connection with a ram jet power plant having a fixed air intake passage and a fixed discharge nozzle so that the only variable which may be regulated to vary the thrust produced by the power plant is the rate at which fuel is supplied to the combustion chamber of said power plant.

Referring to the drawing, a ram jet engine 10 is illustrated as comprising a duct 12 having a center body 14 coaxially supported within and adjacent to the forward end of said duct thereby forming an annular forwardly directed air intake opening 16. The center body 14 is supported within the duct 12 by struts 18. A fuel burner structure 20 is disposed in the combustion chamber portion of the duct 12 downstream of the center body 14. The duct 12 terminates in the usual rearwardly directed exhaust nozzle (not shown) downstream of the burner structure 20 and through which the combustion gases discharge to provide the jet propulsive thrust of the power plant. This much of the ram jet power plant is conventional.

As illustrated, the fuel burner structure 20 comprises a plurality of fuel burner tubes or shields 22. A short tube 24 of smaller diameter is co-axially disposed at the upstream end of each tube 22 and a short tube 26 of still smaller diameter is co-axially disposed at the upstream end of each tube 24. A plurality of fuel nozzles 28 are circumferentially spaced about the annular passage between each pair of tubes 22 and 24 for discharging fuel into said tube 22 and a plurality of fuel nozzles 30 are circumferentially spaced about the annular passage between each pair of tubes 24 and 26 for discharging fuel into said tube 24. An annular fuel manifold 32 is concentric with and is connected to each of the sets of fuel nozzles 28 and 30 and a main fuel supply manifold 34 is connected to each of the manifolds 32 by passages 36 except the fuel manifold 32 for the central burner tube 22 may be supplied with fuel from one of the other fuel manifolds 32 through a passage 38.

The fuel nozzles 28 and 30 comprise the main burners of the combustion chamber. In addition a pilot burner nozzle 40 is provided for each of the tubes 26. The pilot burner nozzles 40 are supplied with fuel from a manifold 42. In order to ignite the pilot burners 40 an ignition flame is provided for one of the pilot burner tubes 26 by a burner tube 44 through which fuel is adapted to be supplied. This igniter fuel is adapted to be ignited by a spark plug 46. The burner tube 44 is only used as an igniter for initiating burning of the pilot burners. Flame crossover tubes 48 provide for ignition of the other pilot burners 40. For clarity the igniter tube 44 and the flame crossover tubes 48 have been omitted from Figure 2. The specific details of the fuel burner structure 20 form no part of the present invention except in that it comprises main burners and pilot burners in which the purpose of the pilot burners is to maintain continuous combustion regardless of the operating conditions of the power plant. Accordingly the fuel-air ratio of the mixture supplied to each pilot burner duct 26 is maintained substantially constant while the overall fuel-air ratio is varied to obtain the desired thrust. A power control system embodying this feature is hereinafter described.

A ram jet power plant does not provide shaft power so that an auxiliary source of shaft power must be provided for driving the auxiliary equipment of the power plant. For this purpose two air turbines 50 and 52 are mounted within the ram jet center body 14. The air turbine 50 has an intake duct 54 which extends rearwardly into the center body from the forward end of one of the struts 18. At its downstream end the turbine intake duct merges with an annular portion 56 which terminates in a turbine nozzle 58. The turbine nozzle 58 directs air against the rotor blades 60 of the turbine 50 for driving said turbine. The turbine 50 also has an exhaust duct 64 which opens through the hollow wall of the ram jet engine duct 12, said exhaust duct passing through one of the struts 18. An axially movable valve 66 is provided for throttling the air flow to the turbine 50. The details of the valve 66 are best seen in Figure 4 and are more fully described in copending application Serial No. 57,144, filed October 29, 1948, by H. E. Barrett et al., and now abandoned.

With this construction of the air turbine 50, when the ram jet power plant is in flight the ram pressure of the air entering the intake duct 16 provides an air pressure differential between the turbine intake duct 54 and the turbine exhaust duct 64. As a result of this pressure differential air flows through the turbine 50 from the duct 54 to drive said turbine, said air discharging out through the exhaust duct 64. The turbine valve 66 is movable to control the speed of the air turbine 50 by throttling the air flow thereto.

The air turbine 52 has an intake duct 70 which extends rearwardly into the center body 14 from the forward end of one of the struts 18. At its downstream end said duct becomes annular and terminates in a turbine nozzle which directs air against the rotor blades 72 of the turbine 52 for driving said turbine. From the turbine rotor blades 72 the air discharges through an exhaust duct 76 which extends through one of the struts 18 and through the hollow wall of the ram jet duct 12. A valve 78 is axially movable to throttle the air flow to the turbine 52. As described the two air turbines 50 and 52 are substantially identical.

The air turbine 50 is drivably connected to an alternating current generator or alternator 80 through gears 82 and 84 and a shaft 86. In addition the turbine 50 is drivably connected to speed sensing mechanism 88 for providing a fluid pressure which is proportional to the speed of said turbine. A suitable speed sensing mechanism is disclosed in copending application Serial No. 73,562, filed January 29, 1949 (now Patent No. 2,657,699), by H. E. Barrett et al. The speed sensing mechanism is connected to a source of air pressure 90 through an air supply passage 92 and a pressure regulating valve 94. The output pressure of the speed sensing mechanism is transmitted through a passage 96 to the space behind a piston 98. The piston 98 is connected to the turbine valve 66 whereby the air pressure behind said piston urges said valve in the closing direction against a spring 100. In this way, any increase in the speed of the turbine 50 results in an increase in the fluid pressure behind the piston 98 thereby moving the throttle valve 66 in a closing direction so as to reduce the speed of the turbine 50 to the value for which the speed sensing mechanism is set. Accordingly the valve 66 is automatically adjusted by the speed sensing mechanism 88 to maintain the speed of the turbine 50 at a substantially constant value thereby maintaining the speed of the alternator 80 substantially constant.

The source of air pressure 90 preferably comprises a plurality of cylindrical bottles or tanks 90a joined together by a manifold and disposed in circumferentially spaced relation around the alternator 80, as illustrated in Figure 1, thereby providing a compact arrangement within the center body 14.

The air turbine 52 is drivably connected to a fuel pump 102 through a shaft 104 and gears 106 and 108. In addition a gear 110 is freely journaled on the shaft 104, said gear being disposed in mesh with the alternator shaft gear 84. A friction clutch, having a plate 112 connected to the gear 110 and having another plate 114 axially splined to the shaft 104, is engageable to drivably connect the gear 110 to the shaft 104. A piston 116, slidable within a cylinder 118, is connected to the movable clutch plate 114 by a lever 120. A spring 122 urges the piston 116 in the clutch disengaging direction. A fluid under pressure is adapted to be supplied to the cylinder 118 against the piston 116 from a passage 124 for effecting engagement of the clutch 112, 114 thereby drivably connecting the gear 110 to the turbine shaft 104 so as to drivably connect the turbine 52 to the alternator 80. The purpose of the gear 110 and friction clutch 112, 114 is hereinafter described.

The fuel pump 102 is of the positive displacement type so that the rate at which fuel is supplied by said pump is proportional to the speed of rotation at which said pump is driven. The fuel pump 102 is supplied with fuel from a fuel supply reservoir (not shown) by a conduit 125 and the output of the fuel pump 102 is delivered through a passage 126 to a fuel meter 127. The fuel meter 127 comprises a valve member 128 disposed between the fuel inlet passage 126 and an outlet passage 130, the fuel pressure supplied to said meter 127 acting against said valve 128 to urge it in an opening direction. This fuel pressure force on the valve 128 is balanced by a spring 132 or by other yieldable means, as for example a gas pressure. Upon an increase in the speed of the fuel pump 102 the increase in fuel flow results in an increase in the pressure of the fuel supplied to the valve 128 thereby moving said valve in an opening direction against the spring 132 so as to accommodate the increase in the fuel flow. The valve 128 assumes a position in which the spring force and fuel pressure are again balanced. Similarly a decrease in the fuel flow results in movement of the valve 128 in the closing direction in order to maintain a balance between the force of the spring 132 and the fuel pressure acting against the valve 128. Therefore, the axial position for the valve 128 is a function of the rate of fuel flow through the passage 128.

The stem of the fuel valve 128 comprises a needle or slab valve 134 having a contoured surface 136 arranged to control the discharge port area of a passage 138 which is vented to the surrounding atmosphere. The passage 138 communicates with the air supply passage 92 through a restricted orifice 140. Accordingly the rate at which air bleeds through the passage 138 to the atmosphere is controlled by the axial position of the valve 134 and since this axial position is a function of the fuel flow, the air pressure in the passage 138 constitutes a pressure signal which is a function of said fuel flow. The air pressure signal in the passage 138 is transmitted through a passageway 142 to means for regulating the rate of fuel flow by controlling the position of the air throttle valve 78 of the turbine 52, said means being hereinafter described.

A portion of the fuel supplied to the fuel metering valve 128 is circulated in heat exchange relation with the alternator 80 for cooling said alternator. For this purpose, a passage 144 leading to the alternator 180 is supplied with fuel from the passage 126 through a restricted orifice 146. This cooling fuel flows in heat exchange relation with the alternator 80 as schematically indicated by the flow path 147 and said fuel is returned directly from the alternator 80 to the outlet passage 130 of the valve 128 by a passage 148. The spring 132 of the fuel metering valve 128 has a low spring rate and the range of movement of the valve 128 is small whereby throughout the fuel flow range of the power plant the pressure of the fuel against the head of the valve 128 is substantially constant and the rate at which fuel is circulated through the alternator is substantially constant.

The outlet passage 130 of the fuel metering valve 128 communicates with a chamber 150 within a burner control valve 152. A passage 154 communicates at one end and with said valve chamber 150 through a restricted orifice 156 and at the other end said passage communicates with the fuel manifold 42 for the pilot burners 40. A passage 158 also communicates at one end with the valve chamber 150, the other end of this latter passage communicating with the fuel manifold 34 for the main burners 28 and 30. The extent to which the passage 158 is in communication with the valve chamber 150 is controlled by a valve member 160. One side of the valve 160 is subjected to the pressure of the fuel supplied to the valve chamber 150 for urging said valve in a direction for uncovering the main burner passage 158. The other side of the valve 160 is connected to the downstream side of the restricted orifice 156 by a passage 162. A piston 164, slidable within a cylinder 166, is connected to the valve member 160, one end of the cylinder 166 being vented through an opening 168 to the surrounding atmosphere. The other end of the cylinder 166 communicates with a passage 170 through which is supplied a fluid under pressure proportional to the rate of mass air flow through the intake duct 16 of the ram jet power plant. A means whereby this latter pressure signal is obtained is hereinafter described.

With this structure of the valve 152, the pressure differential across the piston 164 is a measure of the rate of mass air flow through the main jet duct 12 and therefore is also a measure of the rate of mass air flow through the pilot burner tubes 26. The pressure differential across the valve member 160 is equal to the pressure differential across the orifice 156 and therefore constitutes a pressure signal which is a measure of the rate at which fuel is supplied to the pilot burner 42. In addition the valve 160 and its piston 164 will automatically assume a position in which the pressure differential across said valve balances the pressure differential across said piston. Accordingly the valve 160 automatically varies the extent to which the main burner passage 158 is uncovered so that the pressure differential across the valve member 160, which pressure differential is a measure of the fuel flow to the pilot burners, is maintained equal to the pressure differential across the piston 164, said latter pressure differential being a measure of the rate of mass air flow through the pilot burner tubes 26. Therefore the fuel supplied to the chamber 150 by the pump 102 is automatically divided by the valve member 160 between the passage 154 for the pilot burners and the passage 158 for the main burners so that the fuel-air ratio of the combustible mixture supplied to the pilot burner tubes 26 remains substantially constant regardless of the total rate at which fuel is supplied to the ram jet combustion chamber.

As previously stated, the burner control valve 152 is provided with a fluid pressure signal proportional to the rate of mass air flow through the ram jet duct 12. In order to obtain such a pressure signal, the pressure differential between the static and total pressures of the air entering the ram jet duct is used as a measure of the rate of mass flow of air into said duct. This pressure differential is measured by a Pitot-static tube arrangement disposed in the air stream in the intake passage 16. As illustrated the pressure measured by a static tube 174 is transmitted to one side of a flexible diaphragm 176 by a passage 178. The pressure measured by a Pitot tube 180 is transmitted to the other side of said diaphragm 176 by a passage 182. With such an arrangement the pressure differential across the diaphragm 176 would be a measure of the rate of mass air flow through the ram jet duct if the air density remained constant. Since, however, the air density will vary widely it is necessary to provide means to vary said pressure differential with changes in the air density. For this purpose a density meter 184 has been provided. The density meter 184 is disposed so as to be subjected to the same air pressure and temperature conditions as the Pitot and static tubes 174 and 180. Accordingly the density meter 184 and the Pitot and static tubes may all be supported in the ram jet air stream in the intake passage 16 by one of the struts 18.

The density meter 184 comprises a housing 186 having a chamber 188. A bellows-type flexible diaphragm 190 has one end secured to a wall of said chamber 188 whereby expansion and contraction of the bellows 190 respectively decreases and increases the volume of the chamber 188. The other end of said bellows is connected to a valve 192 for controlling the communication between the passage 182 and the Pitot tube 180. The housing 186 is also provided with a second chamber 194. A bellows-type flexible diaphragm 196 separates the chambers 188 and 194, said bellows being connected to a valve 198 slidably fitted within a cylinder bore 200 comprising an extension of the chamber 194. The housing chamber 194 is subjected to the same static pressure as measured by the tube 174. For this purpose the chamber 194 may be connected directly to the static tube by a passage 202 as illustrated although obviously this is not necessary. The end of the bore 200 remote from the bellows 196 is in communication with the chamber 194 through a passage 204. The valve 198 has an annular groove 206 intermediate its ends and a passage 208 supplies air under pressure to said groove from the air supply passageway 92. The groove 206 also communicates with the interior of the bellows 190 through a passage 212 and the edge 210 of the valve groove 206 is movable across the end of the passage 212 remote from the bellows 190. The passage 212 is also provided with a restricted vent 214 to the surrounding atmosphere.

The pressure in the closed chamber 188 acts against the bellows end of the valve 198 to oppose the static pressure acting against the other end of the valve 198 in the bore 200. The effective areas of the ends of the valve 198 to the fluid pressures acting axially thereon are made the same whereby the pressures acting against the two ends of the valve 198 are balanced when the pressure in the closed chamber 188 is equal to the static air pressure being measured. With this construction of the density meter, the valve 198 automatically moves to vary the pressure within the bellows 190 whenever a pressure differential exists across the ends of said valve. The valve 198 automatically controls the pressure within the bellows 190 so that the expansion of said bellows makes the volume of the chamber 188 of such magnitude that the pressure in said chamber 188 is equal to said static pressure.

The density meter 184 is disposed in the air stream at the point the static and total air pressures are measured so that the temperature of the air in the closed chamber 188 is also equal to the temperature of the air at the point its flow is being measured by the Pitot-static tube arrangement. Since both the pressure and temperature of the air in the chamber 188 are maintained equal to the pressure and temperature of the air being measured, the density of the air in the chamber 188 is automatically maintained equal to the density of the air at the point its flow is being measured by the Pitot-static tube arrangement. This is true regardless of the spring force of the bellows 190 or of the effect of the ram pressure on the end of the valve 192. The density of the air in the chamber 188 is inversely proportioned to the volume of said chamber and said volume is varied by the axial expansion and contraction of the bellows 190. Therefore the axial expansion and contraction of the bellows 190 and the axial position of the valve 192 moved by said bellows are both functions of the density of the air in the chamber 188 which density is equal to the density of the air whose flow is being measured by the Pitot-static tube arrangement. Instead of air, the chamber 188 obviously may contain any stable gas.

It should be noted that expansion and contraction of the bellows 196 also varies the volume of the chamber 188. However the valve 198, to which the bellows 196 is connected, only has a small range of movement between its positions for maximum and minimum pressure within the bellows 190 so that the effect of the bellows 196 on the volume of the chamber 188 is small. The effect of expansion and contraction of the bellows 196 on the volume of the chamber 188 can be made as small as desired by making the volumetric displacement of the bellows 196 small compared to the volume of the chamber 188. To this end the diameter of the bellows 196 preferably is small compared to the diameter of the chamber 188.

The valve 192 controlled by the bellows 190 has a contoured surface 216 which controls the extent to which the passage 182 is in communication with the Pitot tube 180. In addition a passage 218, having a restricted orifice 220, connects the passage 182 with the static tube passage 178 so that air continually bleeds from the Pitot tube 180 past the valve 192 into the passage 182 and thence through the passage 218, and its restricted orifice 220, into the static tube passage 178. Accordingly, there is a pressure drop across the valve 192 so that the pressure in the passage 182 is less than the total air pressure in the Pitot tube 180 by an amount dependent on the position of the valve 192 which position in turn depends on the density of the air whose flow is being measured. It is evident therefore that the surface 216 of the valve 192 can be made to modify the pressure differential between the Pitot tube 180 and the static tube 174 so that the pressure differential across the diaphragm 176 is proportional to the rate of mass flow of air into the ram jet intake duct 16 regardless of the density of said air.

The diaphragm 176 forms part of an air meter 222 for providing an air pressure proportional to the rate of mass flow of air into the ram jet duct. For this purpose the diaphragm 176 is connected to a valve member 224 which is slidably fitted within a bore. Intermediate its ends the valve member 224 has an annular groove 226 and air under pressure from the air supply passage 92 is supplied to said annular groove through a passage 228. The edge 230 of the valve 224 controls the extent to which a passage 232 is in communication with the annular valve groove 226. The passage 232 contains a restricted orifice 233 downstream of its connection with the passage 170 and said passage 232 terminates in a chamber having a variable restricted vent opening as hereinafter described. The end of the valve 224 remote from the diaphragm 176 is connected to another flexible diaphragm 234. One side of the diaphragm 234 is vented to the surrounding atmosphere through an opening 236 while the other side of said diaphragm is in communication with the passage 232 through a passage 238. With this arrangement of the air meter 222, the pressure differential across the diaphragm 176 urges the valve 224 in a direction for uncovering the passage 232 and the pressure in said passage acts against the diaphragm 234 to oppose this movement. Accordingly the valve 224 automatically maintains an air pressure in the passage 232, upstream of its restrictive orifice 233, proportional to the pressure differential across the diaphragm 176 whereby said air pressure in the passage 232 constitutes a pressure signal which is a measure of the rate of mass air flow into the ram jet duct 12.

The air pressure in the passage 232 is transmitted through the passage 170 for positioning the burner control valve 152 as previously described. In this connection it should be noted that since the division of air flow between the various burners of the jet engine is substantially constant regardless of changes in said flow, the pressure in the passage 232 not only is a measure of the total rate of mass air flow through the ram jet duct, but said pressure also is a measure of the rate of mass air flow to the pilot burners.

As already mentioned the thrust produced by the ram jet power plant 10 is to be regulated by varying the fuel flow to the combustion chamber of said power plant. For this purpose a thrust selector valve 240 is provided. This valve is the plunger of a solenoid winding 242 connected by conductors 244 and 246 to the alternator 80. A resistance 248 with an adjustable contact arm 250 is interposed in the conductor 244 for varying the magnitude of the electric current flowing through the solenoid winding 242. A spring 252 urges the solenoid plunger 240 against the magnetic force acting on said plunger as a result of the current flowing through the solenoid winding 242. The forward end of the plunger 240 extends into a chamber 254 to which the passageway 232 is connected through its restricted orifice 233. The valve 240 has a surface 258 which controls a restricted bleed orifice 260 connecting the chamber 254 to the surrounding atmosphere. With this arrangement the position of the valve 240 determines the rate of air flow through the passage 232 and its restricted orifice 233 into the chamber 254 and out past the valve 240 through the bleed opening 260. Movement of the valve 240 to the left, as viewed in the drawing, reduces the size of the bleed opening 260 thereby increasing the air pressure in the chamber 254 while movement of the valve 240 in the opposite direction results in a decrease in pressure in said chamber. Therefore the pressure in the chamber 254 constitutes a pressure signal which is a function of the rate of mass air flow into the ram jet duct 12 and is a function of the position of the valve 240.

The pressure in the chamber 254 is transmitted through a passage 262 to a fuel-air ratio regulator 263. Said regulator comprises a cylinder 264 in which a piston 266 is slidable, the passage 262 being in communication with one end of said cylinder. The other end of the cylinder 264 is subjected to the pressure of the air in the passage 142 which pressure, as previously explained, is proportional to the rate at which fuel is supplied to the ram jet combustion chamber. The piston 266 is connected to a valve 268 slidable in a bore 270, said valve having an annular groove 272 intermediate its ends. Air under pressure is supplied to the annular groove 272 from the air supply passage 92 through passages 274 and 276. The edge 278 of the groove 272 controls the extent to which one end of a passage 280 is in communication with the valve groove 272. The other end of the passage 280 communicates with a space behind a piston 282, said piston being connected to the air throttle valve 78 of the turbine 52. The fit of the piston 282 is sufficiently loose within its cylinder so that air can leak through the passage 280 around said piston whereby the valve 268 is movable to control the pressure acting against said piston. In addition to or in lieu of the loose fit of the piston 282 within its cylinder the passage 280 may be provided with a restricted vent 283 to provide for air flow through the passage 280 past the valve 268. The air pressure supplied by the passage 280 against the piston 282 urges the air throttle valve 78 in a closing direction against a spring 284.

With this construction of the selector valve 240 and the fuel air regulator 263, if the resistor arm 250 is moved to decrease the current flowing through the solenoid 242, the spring 252 will move the valve 240 so as to effect a closing adjustment of the bleed opening 260 thereby increasing the pressure in the chamber 254. This increase in pressure is transmitted through the passage 262 and acts against the piston 266 to move the valve 268 in the direction for effecting a closing adjustment of the passage 280 thereby reducing the pressure acting against the turbine valve piston 282 whereupon the spring 284 moves the turbine valve 78 in an opening direction. An opening adjustment of the valve 78 results in an increase in speed of the air turbine 52 and of the fuel pump 102 drivably connected to said turbine. The speed of the fuel pump 102 increases until the increase in the fuel flow proportional pressure in the passage 142 is sufficient to again balance the opposing pressure acting against the piston 266. The resulting increase in fuel flow increases the output thrust of the ram jet power plant. Similarly an increase in the current flowing through the solenoid 242 moves its valve 240 to reduce the pressure transmitted through the passage 262 to the piston 266 whereby the valve 268 opens to increase the pressure acting against the turbine valve piston 282. The piston 282 thereupon moves the turbine valve 78 in a closing direction until the speed of the fuel pump 102 has been reduced to the point at which the fuel flow proportional pressure in the passage 142 again balances the opposing pressure acting on the piston 266. The resulting decrease in fuel flow decreases the output thrust of the ram jet power plant.

For a given position of the thrust selector valve 240 the pressure transmitted against the piston 266 through the passage 262 is proportional to the pressure in the passage 232 upstream of its restriction 233 which latter pressure is proportional to the rate of mass air flow through the ram jet duct. The opposing pressure on the piston 266, transmitted through the passage 142, is proportional to the total fuel flow to the ram jet combustion chamber. Furthermore, as described, the fuel-air regulator 263 automatically varies the fuel flow to maintain the opposing pressures on the piston 266 equal. Therefore, for a given position of the thrust selector valve 240, the regulator 263 automatically maintains constant the fuel-air ratio of the total fuel and air supplied to the ram jet combustion chamber. Movement of the selector valve 240 varies the fuel-air ratio to vary the power plant thrust. It is apparent therefore that the range through which the fuel-air ratio can be adjusted is limited by the range of adjustment of the valve 240 whereby the total fuel-air ratio can be maintained within fixed limits such that the fuel-air ratio cannot be made too rich or too lean for combustion.

The control system described depends on the air turbines 50 and 52 for at least a portion of its power so that it is not possible to operate the components of the control system in a normal manner while the ram jet power plant is on the ground. It is desirable, however, to pre-flight check various accessories. For this purpose the alternator 80 is of a type which may be driven as an electric motor by supplying electric power thereto from an external source (not shown). The solenoid 290 has terminals 291 for connection to said external source of power. When the solenoid 290 is energized a normally closed valve 292 is opened by said solenoid to connect the air supply passage 92 through the passage 274 to the passage 124 communicating with the clutch actuating piston 166. Therefore, upon energization of the solenoid 290 air pressure acts against the piston 116 to engage the friction clutch 112, 114 thereby connecting the turbine 52 to the alternator 80. Operation of the alternator 80 as a motor then drives both turbines 50 and 52 thereby driving the fuel pump 102 and the speed sensing mechanism 88. It is undesirable, however, to have raw fuel pumped into the ram jet combustion chamber merely for checking fuel pump operation so that a fuel by-pass valve 294 is opened at this time. For this purpose the valve 294 is movable to the left, from its position illustrated, to shut off the fuel passage 130 from the passages 154 and 158 and to open said fuel passage 130 to a by-pass passage 296 communicating with the inlet side of the pump 102. The by-pass valve 294 is connected to a piston 298 and a spring 300 acts against said piston to hold the valve 294 normally in the position illustrated. Air pressure is adapted to be supplied against the piston 298 from the passage 124 through a passage 302 for opening the fuel by-pass valve 294 when the solenoid 290 is energized. Accordingly, when the fuel pump and other accessories, such as the speed sensor 88, are to be checked, the alternator 80 is operated as a motor to drive the turbines 50 and 52 and the solenoid valve 292 is opened whereupon the clutch 112, 114 is engaged to drivably connect the alternator 80 to the turbine 52 and to the fuel pump 102 and the fuel by-pass valve 294 is opened to by-pass fuel back to the inlet of said pump.

The air meter 222, thrust selector valve 240, fuel-air regulator 263 and the solenoid valve 292 may be mounted within a housing 304 disposed within the center body 14. In the case of a pilot controlled aircraft, the thrust selector valve 240 would be controlled by the pilot. In the case of a guided missile the thrust selector valve 240 would be controlled by the guidance equipment of said missile. Said guidance equipment, however, forms no part of the present invention.

While I have described my invention in detail in its present preferred embodiment, it will be obvious to those skilled in the art, after understanding my invention, that various changes and modifications may be made therein without departing from the spirit or scope thereof. For example in lieu of the pneumatic control system described, it will be obvious that electric or hydraulic systems could be provided for performing the same functions as said pneumatic system. I aim in the appended claims to cover all such modifications and changes.

I claim as my invention:

1. A control system for a jet engine having a main burner and a pilot burner for said main burner; said system comprising means for supplying fuel to said burners; means operable for varying the total rate of fuel supply to said burners; means providing a signal which is a measure of the rate of air flow to said pilot burner; means providing a signal which is a measure of the rate of fuel flow to said pilot burner; and means operable in response to changes in said signals for automatically dividing said total fuel supply between said burners so as to maintain a substantially constant fuel-air ratio at said pilot burner.

2. A control system for a jet engine having a main burner and a pilot burner for said main burner; said system comprising means for supplying fuel to said burners; means operable for varying the total rate of fuel supply to said burners; means providing a signal which is a measure of the rate of air flow to said pilot burner; means providing a signal which is a measure of the rate of fuel flow to said pilot burner; and means, including a valve movable in response to changes in said signals, for controlling the division of said total fuel supply between said burners so as to maintain a substantially constant fuel-air ratio at said pilot burner.

3. A control system for a jet engine having a main burner and a pilot burner for said main burner; said system comprising means for supplying fuel to said burners; means providing a signal which is a measure of the rate of air flow to said burners; means responsive to changes in said signal for varying the total rate of fuel supply to said burners; means providing a signal which is a measure of the rate of fuel supply to said pilot burner; and means operable in response to changes in said signals for automatically dividing said fuel between said burners so as to maintain a substantially constant fuel-air ratio at said pilot burner.

4. A control system as recited in claim 3 in which said last-mentioned means includes a valve movable in response to changes in said signals to control said division of fuel, said valve member being urged in a direction for increasing the rate of fuel supply to the pilot burner with a force proportional to said first signal and being urged in a direction for decreasing said pilot burner fuel supply rate with a force proportional to said second signal.

5. A control system for a jet engine having a main burner and a pilot burner for said main burner; said system comprising means for supplying fuel to said burners; means operable for varying the total rate of fuel supply to said burners; means providing a first fluid pressure signal which is a measure of the rate of air flow to said pilot burner; means providing a second fluid pressure signal which is a measure of the rate of fuel flow to the pilot burner; and means, including a valve movable in response to changes in said signals, for automatically dividing said total fuel supply between said burners so as to maintain a substantially constant fuel-air ratio at said pilot burner, said valve being urged in a direction for increasing the rate of fuel supply to the pilot burner with a force proportional to said first pressure signal and being urged in a direction for decreasing said pilot burner fuel supply rate with a force proportional to said second pressure signal.

6. A control system for a jet engine having a main burner and a pilot burner for said main burner; said system comprising a pump for supplying fuel to said burners; means for varying the output delivery rate of said fuel pump to said burners; a chamber having an inlet passageway through which fuel is delivered to said chamber by said pump and having first and second outlet passageways for supplying said fuel to said main and pilot burners respectively from said chamber; a valve for controlling the extent to which said first passageway is open to said chamber whereby movement of said valve in a direction to close said first passageway results in a decrease in the rate of fuel supply to said main burner and in a corresponding increase in the rate of fuel supply to the pilot burner and movement of said valve in a direction to open said first passageway results in an increase in the rate of fuel supply to the main burner and in a corresponding decrease in the rate of fuel supply to the pilot burner; means for urging said valve in a direction for opening said first passageway with a force varying with the rate of fuel supply to the pilot burner; and means for urging said valve in the opposite direction with a force varying with the rate of mass air flow to the burners.

7. A control system as recited in claim 6 in which said pump comprises a positive displacement type pump and the means for varying the delivery rate of said pump comprises means for varying the speed of operation of said pump.

8. A control system for a ram jet engine; said system comprising a fluid turbine; means for bleeding off a portion of the motive fluid of said jet engine for driving said turbine; a fuel pump arranged to be driven by said turbine; a member movable to vary the speed of said turbine so as to vary the rate of fuel flow to said engine; means providing a first signal which is a measure of said fuel flow rate; means providing a second signal which is a measure of the rate of air flow to said engine; and means operable in response to changes in said first and second signals for moving said turbine speed varying member so that a decrease in said air flow and an increase in said fuel flow each would cause movement of the turbine speed varying member in a direction to decrease the turbine speed thereby causing a decrease in said fuel flow rate.

9. A control system for a ram jet engine; said system comprising a fluid turbine; means for bleeding off a portion of the motive fluid of said jet engine for driving said turbine; a fuel pump arranged to be driven by said turbine; a member movable to vary the speed of said turbine so as to vary the rate of fuel flow to said engine; means providing a first signal which is a measure of said fuel flow rate; means providing a second signal which is a measure of the rate of air flow to said engine; means operable in response to changes in said first and second signals for moving said turbine speed varying member so that a decrease in said air flow and an increase in said fuel flow each would cause movement of the turbine speed varying member in a direction to decrease the turbine speed thereby causing a decrease in said fuel flow rate; and means movable to vary said fuel flow rate independently of changes in said air and fuel flow rates.

10. A control system for a ram jet engine; said system comprising a fluid turbine; means for bleeding off a portion of the motive fluid of said jet engine for driving said turbine; a fuel pump arranged to be driven by said turbine; a member movable to vary the speed of said turbine so as to vary the rate of fuel flow to said engine; means providing a first fluid pressure which varies with changes in said rate of fuel flow; means providing a second fluid pressure which varies with changes in the rate of air flow to said engine; and means operable in response to changes in said first and second pressures for moving said turbine speed varying member so that a decrease in said air flow and an increase in said fuel flow each would cause movement of the turbine speed varying member in a direction to decrease the tubine speed thereby causing a decrease in said fuel flow rate, said second fluid pressure providing means including a valve movable independently of changes in said air flow rate for varying said second pressure.

11. A control system for a ram jet engine; said system comprising a fluid turbine; means for bleeding off a portion of the motive fluid of said jet engine for driving said turbine; a fuel pump arranged to be driven by said turbine; a member movable to vary the speed of said turbine so as to vary the rate of fuel flow to said engine; means providing a first fluid pressure which is a measure of said rate of fuel flow; means providing a second fluid pressure which is a measure of the rate of air flow to said engine; and means operable in response to changes in said first and second pressures for moving said turbine speed varying member so that a decrease in said air flow and an increase in said fuel flow each would cause movement of the turbine speed varying member in a direction to decrease the turbine speed thereby causing a decrease in said fuel flow rate.

12. A control system for a jet engine having a main burner and a pilot burner for said main burner; said system comprising means for supplying fuel to said burners; means providing a first signal which is a measure of the rate of air flow to said burners; means providing a second signal which is a measure of the rate of fuel flow to said pilot burner; means, including a movable member, for providing a third signal which is a function of said air flow rate and of the movement of said member; means operable in response to changes in said second and third signals for varying the total rate of fuel supply to said burners; and means operable in response to changes in said first and second signals for controlling the division of said total fuel supply between said main and pilot burners so as to maintain a substantially constant fuel-air ratio at said pilot burner.

References Cited in the file of this patent

UNITED STATES PATENTS

| Number | Name | Date |
|---|---|---|
| 996,334 | Haskins | June 27, 1911 |
| 1,451,365 | Larsonneur | Apr. 10, 1923 |
| 1,657,344 | Conley | Jan. 24, 1928 |
| 1,778,036 | Noble | Oct. 14, 1930 |
| 2,381,358 | Marshall | Aug. 7, 1945 |
| 2,384,282 | Chandler | Sept. 4, 1945 |
| 2,405,676 | Strub | Aug. 13, 1946 |
| 2,405,888 | Holley | Aug. 13, 1946 |
| 2,410,984 | Lawless | Nov. 12, 1946 |
| 2,442,954 | Lee | June 8, 1948 |
| 2,457,595 | Orr, Jr. | Dec. 28, 1948 |
| 2,463,851 | Browne | Mar. 8, 1949 |
| 2,465,159 | Lee | Mar. 22, 1949 |
| 2,482,505 | Pierce | Sept. 20, 1949 |
| 2,498,939 | Bobier | Feb. 28, 1950 |
| 2,506,611 | Neal | May 9, 1950 |
| 2,545,703 | Orr, Jr. | Mar. 20, 1951 |
| 2,550,678 | Deacon | May 1, 1951 |